June 17, 1969 C. C. ROBINSON 3,450,285

PORTABLE RECEPTACLE FOR HARVESTED UNGINNED COTTON

Filed Feb. 24, 1967

INVENTOR

GLADYS ISABELLE ROBINSON,
ADMINISTRATRIX OF THE ESTATE OF
CECIL C. ROBINSON, DECEASED

BY Cecil L. Wood

ATTORNEY

June 17, 1969 C. C. ROBINSON 3,450,285

PORTABLE RECEPTACLE FOR HARVESTED UNGINNED COTTON

Filed Feb. 24, 1967 Sheet 2 of 5

INVENTOR
GLADYS ISABELLE ROBINSON,
ADMINISTRATRIX OF THE ESTATE OF
CECIL C. ROBINSON, DECEASED

BY Cecil L. Wood

ATTORNEY

INVENTOR
GLADYS ISABELLE ROBINSON,
ADMINISTRATRIX OF THE ESTATE OF
CECIL C. ROBINSON, DECEASED

BY Cecil L. Wood
ATTORNEY

INVENTOR
GLADYS ISABELLE ROBINSON,
ADMINISTRATRIX OF THE ESTATE OF
CECIL C. ROBINSON, DECEASED

BY Cecil C. Wood

ATTORNEY

INVENTOR
GLADYS ISABELLE ROBINSON,
ADMINISTRATRIX OF THE ESTATE OF
CECIL C. ROBINSON, DECEASED

BY Cecil L. Wood

ATTORNEY

United States Patent Office 3,450,285

Patented June 17, 1969

3,450,285

PORTABLE RECEPTACLE FOR HARVESTED UNGINNED COTTON

Cecil C. Robinson, deceased, late of Poteet, Tex., by Gladys Isbelle Robinson, administratrix, P.O. Box 375, Poteet, Tex. 78065

Filed Feb. 24, 1967, Ser. No. 619,134

Int. Cl. B60p 1/64

U.S. Cl. 214—517 2 Claims

ABSTRACT OF THE DISCLOSURE

Briefly stated the invention comprises a relatively large receptacle having a rectangular frame of light construction supporting a wire mesh enclosure, and whose side and end members are detachably connected so that, when the receptacle is empty, these elements can be easily disconnected and compactly stacked with the bottom element for storage and transportation. The bottom element is provided with skid members by which the receptacle can be moved about with its burden by a tractor, or other draft means. The receptacle is designed to be ported, with like devices on a specially equipped trailer on whose frame may be provided rollers engageable by the skid members, and a diminutive boom adjacent its rearmost end for assistance in loading the receptacle, as by a cable carried on a drum operatively mounted on a road tractor by which the trailer is drawn. The boom is retractable into the trailer frame while in movement. It is contemplated that at least two of the loaded receptacles can be carried on the trailer, in tandem arrangement, each capable of retaining the equivalent of from two to four bales of unginned cotton.

This invention relates to portable receptacles for cotton harvested in the field preparatory to transportation to the gin, and it has particular reference to a collapsible basket adapted to be loaded on a trailer embodying structural features by which the filled receptacles can be expeditiously handled.

*Prior art*

It is common practice in handling cotton in the field, which has been harvested by any one of several methods, as by machines or by hand picking, to provide trailers having bodies formed of open mesh materials, such as wire netting, capable of containing two or more bales of unginned cotton, and such trailers are independent structures having a frame, wheels and a hitch, and are drawn behind a truck, or other vehicle, to the gin yard where the trailer is dropped.

During busy ginning seasons it is not an uncommon occurrence to have several dozen such trailers, loaded with cotton waiting to be ginned, packed in a gin yard. As such conventional type trailers are reached in their turn they are unloaded in the usual manner and towed away to a parking area to be picked up by their owners and returned to the field.

This method of handling cotton is unsatisfactory because of the necessity for multiple investments in rolling stock for the farmers, and the requirement for parking facilities for empty trailers in the gin yard, or on the farmer's premises. Such conventional trailers are not adapted for compact storage between seasons and thus create a problem which may be satisfactorily solved by use of the invention.

*Summary of the invention*

An object of the invention is that of providing a simple and economical means of receiving and transporting cotton from the field to the gin in such manner that several bales of cotton can be efficiently and expeditiously handled in a single trip, and afford means by which the problem of storing the empty receptacles in a relatively small area, avoiding the necessity for the utilization of valuable space for parking a plurality of wheeled units, and minimizing the investment required in the purchase and maintenance of such vehicles.

*Description of the preferred embodiment*

Figure 1:
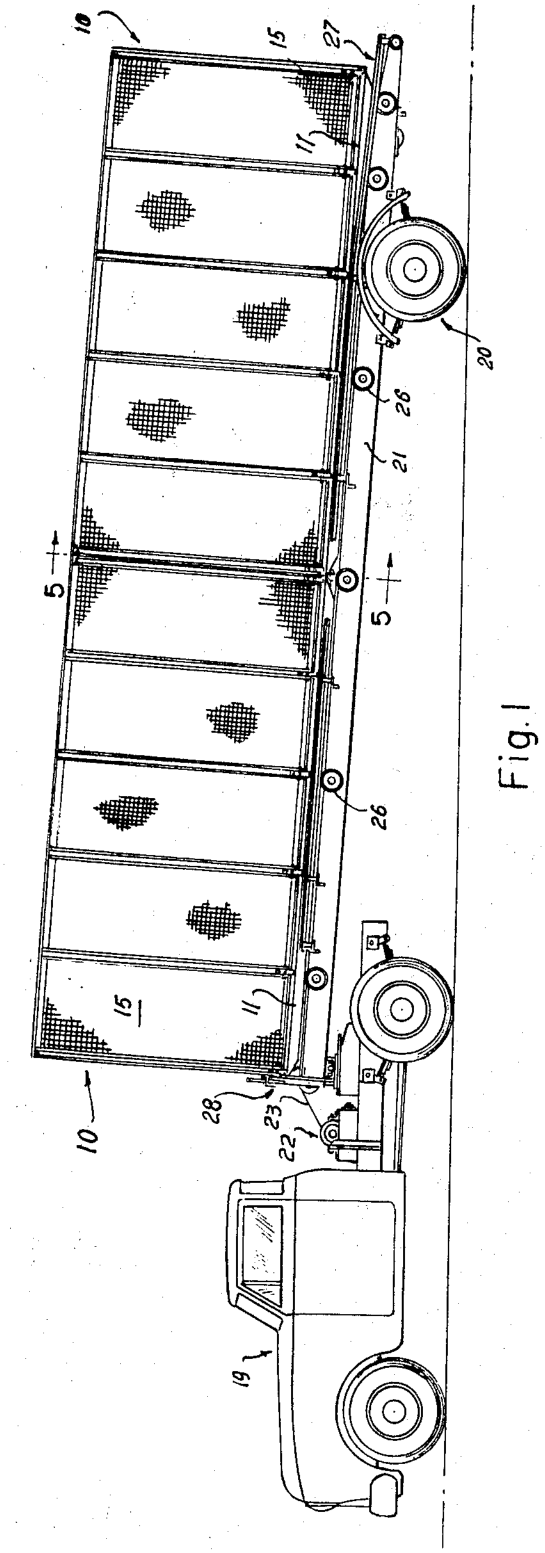
FIGURE 1 of the drawing is a side elevational view of a special truck-trailer unit embodying the invention, showing a pair of receptacles embodying the invention arranged in tandem relation on the trailer chassis.

Referring to FIGURES 5 to 13 of the drawing, the invention includes a large basket type receptacle as hereinafter described, designated generally by the numeral 10, which is arranged on skids, indicated generally by the numeral 11.

Figures 7, 8:
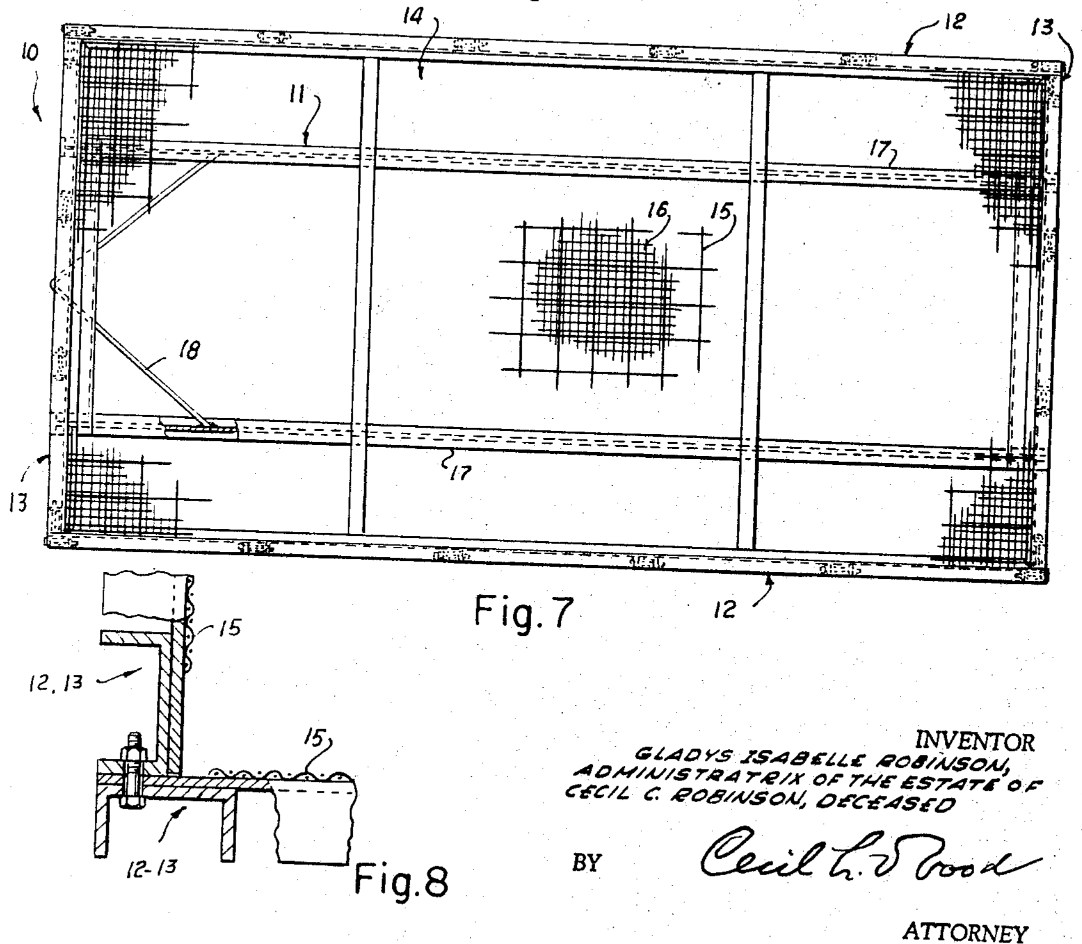
FIGURE 7 is a top plan view thereof, partly broken away.
FIGURE 8 is a fragmentary plan view on an enlarged scale, partly in section taken on line 8—8 of FIGURE 6, illustrating the manner in which adjoining side and end panels of the receptacle are removably connected to each other.

The receptacle 10 is rectangular, having an open top, and has a pair of side panels 12, end panels 13, and a bottom panel 14, each of which has a light weight frame and is formed substantially of open weave wire mesh, indicated by the numeral 15. The bottom panel 14 is additionally reinforced by a thickness of expanded metal 16 in supporting engagement with the wire mesh 15, as shown best in FIGURES 10 and 11. The side and end panels 12 and 13 are removably connected to the bottom panel 14, as shown in FIGURES 10 to 12, and are removably connected to each other, as shown in FIGURE 8, whereby the respective panels 12, 13 and 14 are each separable from the adjoining panels.

Figure 10:
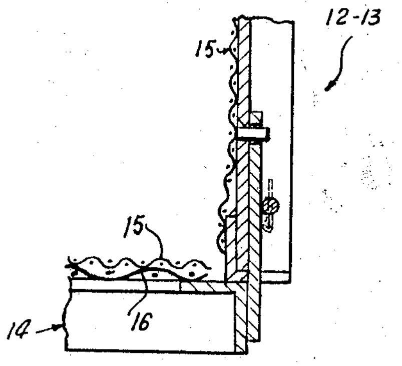
FIGURE 10 is a sectional elevational view of an enlarged scale on line 10—10 of FIGURE 9.
Figure 13:
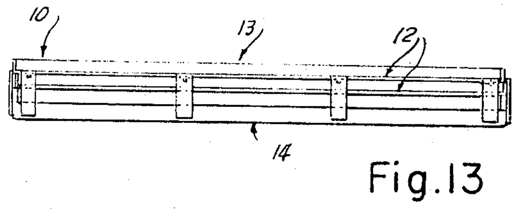
FIGURE 13 is an end elevational view showing the bottom panel and the side and end panels in their stacked disassembled positions relative to each other.
Figure 11:
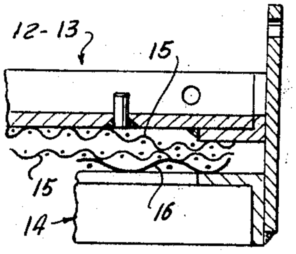
FIGURE 11 is a view similar to FIGURE 10 showing the side or end panel folded on the bottom panel, in the stacked, disassembled positions of the panels relative to each other.
Figure 12:
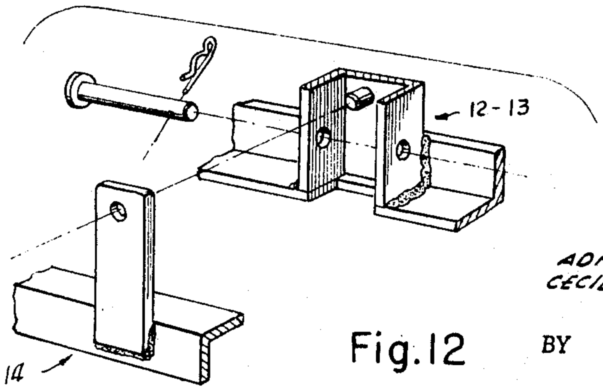
FIGURE 12 is an exploded perspective view showing the structure illustrated in FIGURES 9 to 11.
Figure 6:
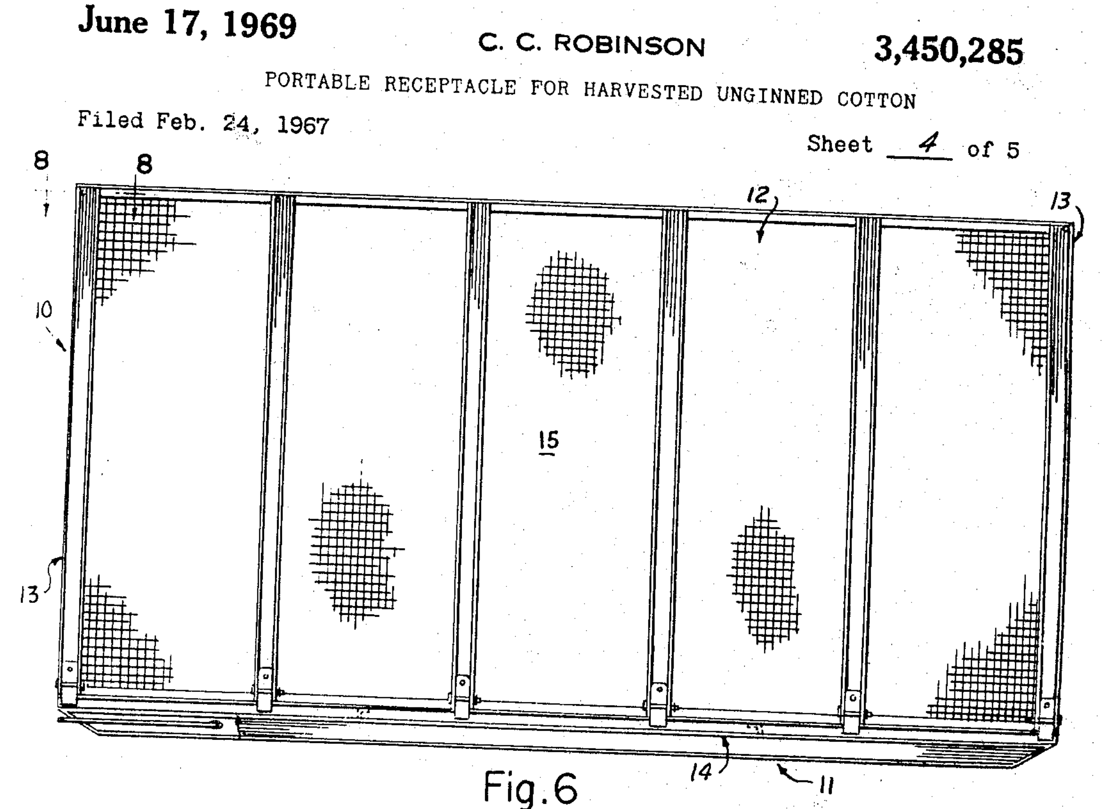
FIGURE 6 is a side elevational view of an enlarged scale showing one of the receptacles in its erected position, substantially as illustrated in FIGURE 1, but independently of the truck-trailer unit.

The side and end panels 12 and 13 are arranged to be folded, one upon another, on the bottom panel 14, in stacked, disassembled positions thereof, as illustrated in FIGURES 10, 11, and 13. As shown in FIGURE 13, the two end panels 13, which are relatively shorter than the side panels 12 and require substantially one-half as much space when stacked, are positioned uppermost, in the same horizontal plane, with their adjacent edges substantially meeting.

The skids 11 comprise a pair of runners 17 on the under side of the receptacle 10 which are integral with the bottom panel 14. A towing connection consisting of an angularly bent rod 18 is secured, as by welding, to the adjacent ends of the runners 17.

Figure 2:
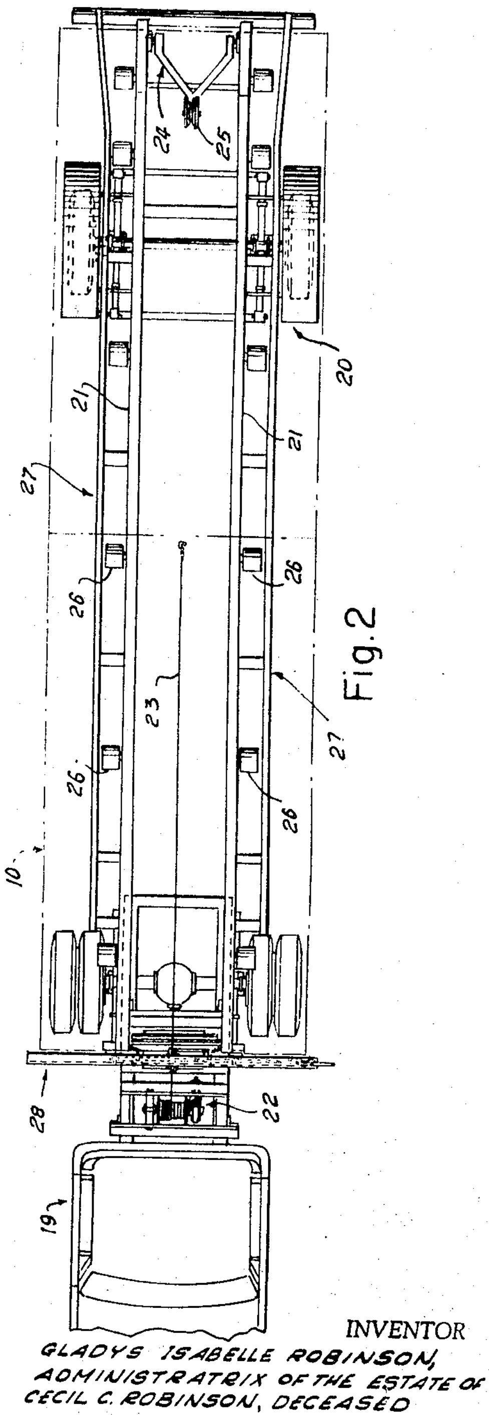
FIGURE 2 is a top plan view of the trailer, showing the receptacles thereon in broken lines.

Referring now to FIGURES 1 and 2 of the drawing, the invention also includes a truck-trailer unit comprising a truck 19 and trailer chassis 20 having an elongated frame which is formed in part by a pair of longitudinally extending frame members 21. As shown in FIGURE 1, a pair of the receptacles 10, as above described, are arranged on the trailer chassis 20 in tandem relation to each other. The truck-trailer unit may have a capacity of the order of about five tons, for example, and each of the receptacles 10 may be filled with as much as 5,000 pounds of cotton as collected in the field, sufficient to yield about four bales after ginning.

Figure 3:
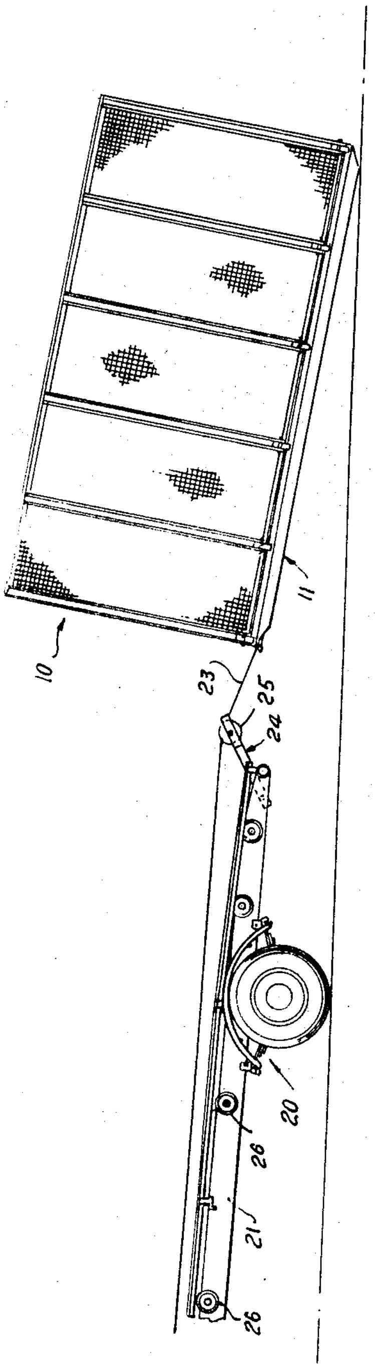
FIGURES 3 and 4 are fragmentary side elevational views on an enlarged scale showing one of the receptacles being loaded on the trailer chassis, showing the retractable boom, in solid lines rearwardly of the trailer chassis in two of its operating positions, and showing in broken lines, in FIGURE 4, the position of the boom in retracted position.
Figure 4:
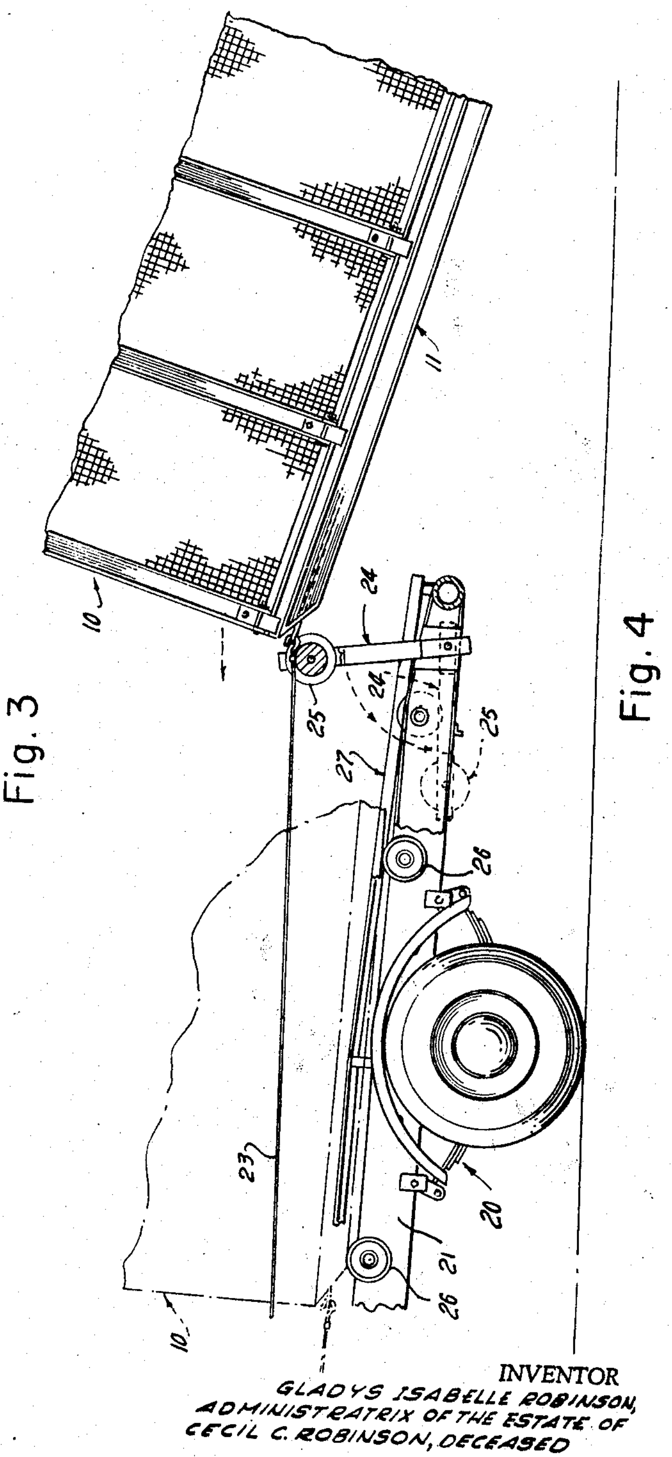
Figure 5:
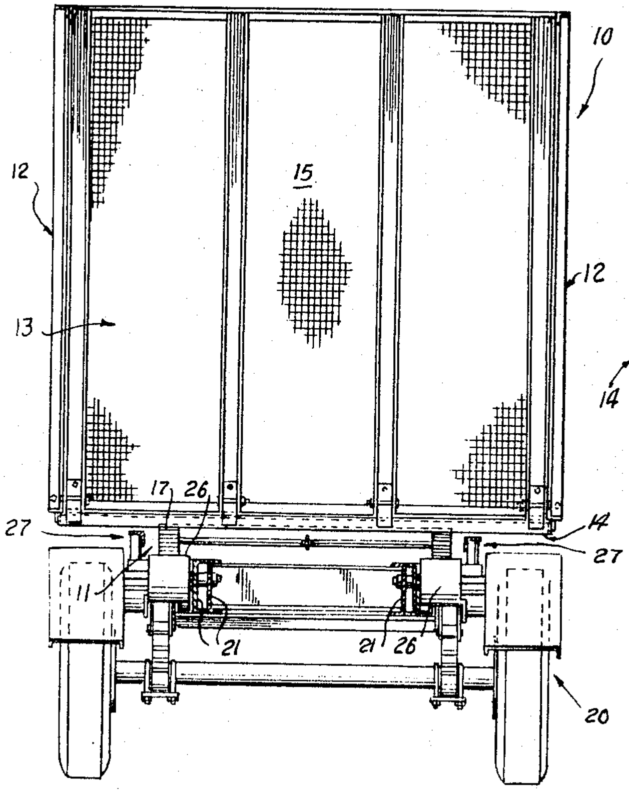
FIGURE 5 is a sectional elevational view of an enlarged scale taken on the line 5—5 of FIGURE 1.
Figure 9:
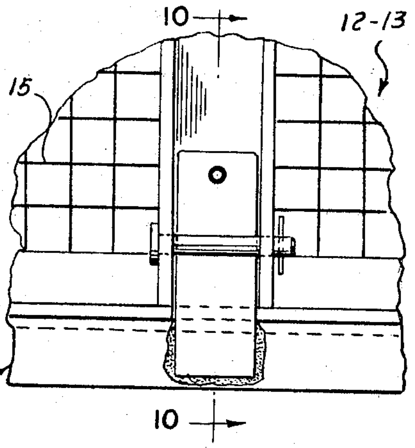
FIGURE 9 is a fragmentary elevational view on an enlarged scale showing fragmentarily a side or end panel of the receptacle in its erected position relative to the bottom panel thereof, substantially as illustrated in FIGURES 5 and 6, showing in detail the structure of such panels and illustrating the manner in which they are removably connected to each other.

As shown in FIGURES 3 and 4, the receptacles 10 are individually loaded on the trailer chassis 20 from its rear end, and then advanced forwardly thereof by means of a winch 22 on the truck 19 having a cable 23 thereon which is operatively connected to the skids 11 of a receptacle 10. A retractable boom 24 is pivotally mounted between the longitudinally extending frame members 21 for pivotal adjustment about a transverse axis, and is movable pivotally from a first position, shown in FIGURE 3, in which it extends upwardly and rearwardly beyond the trailer chassis 20, to a second position, shown in broken lines in FIGURE 4, in which it extends forwardly, substantially parallel to the frame members 21. A pulley wheel 25 is mounted in the boom 24 for engagement by the cable 23, in the said first position of the boom 24, for lifting the receptacle 10 on the trailer chassis 20.

A plurality of rollers 26 on the longitudinally extending frame members 21, which are arranged in pairs in longitudinally spaced relation to each other, are engageable with the skids 11 of the receptacles 10, in supporting relation thereto, and a pair of guide rails 27, on opposite sides of the frame members 21, are engageable by the skids 11 of the receptacles 10 to prevent lateral displacement thereof.

Figures 14, 15, 16, 17:
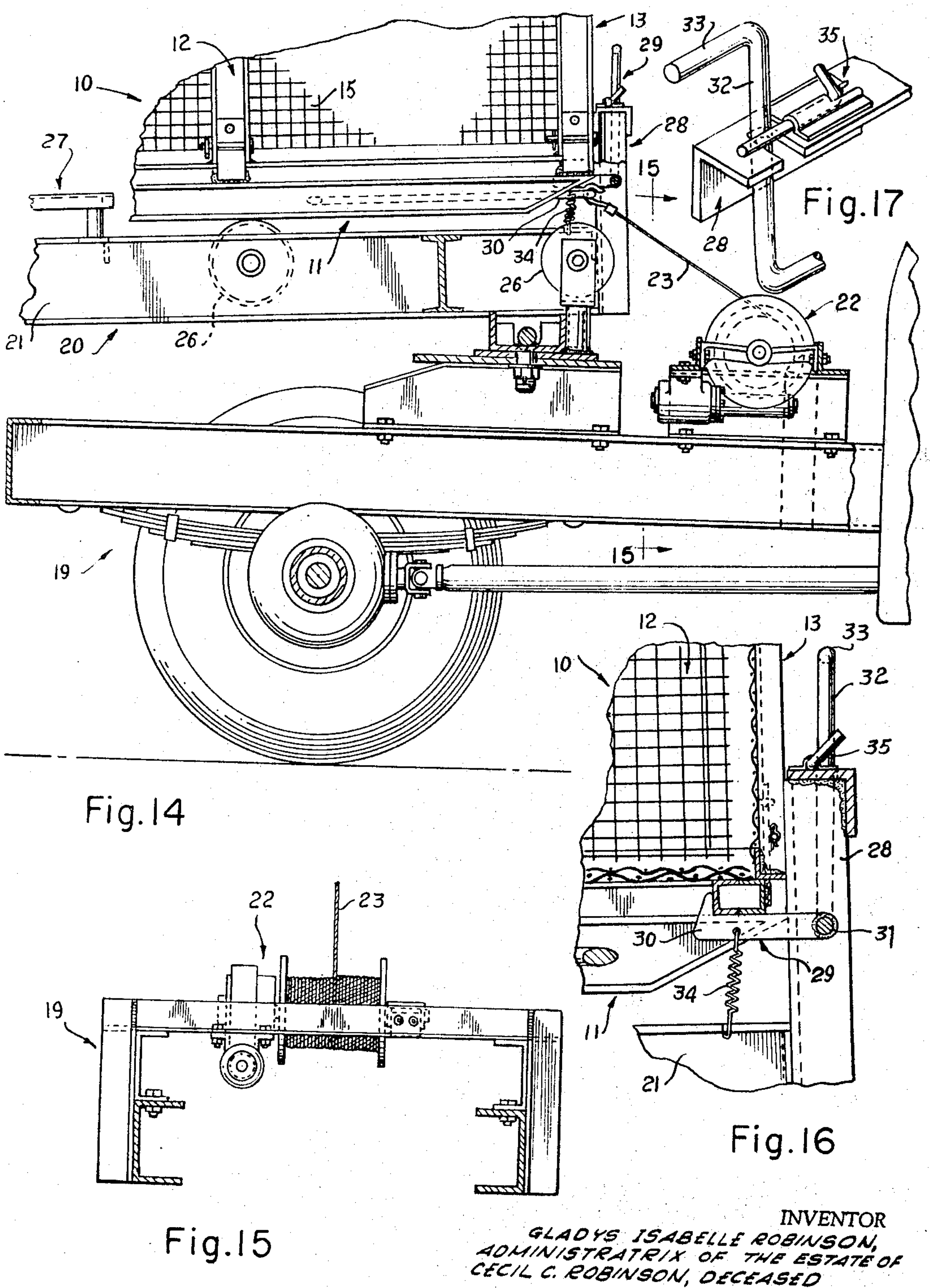
FIGURE 14 is a fragmentary side elevational view on an enlarged scale showing portions of the truck-trailer unit, and showing fragmentarily a receptacle in place forwardly of the trailer chassis, showing the winch on the truck and a cable thereon operatively connected to the skids of the receptacle, two of the rollers and one of the guide rails on the trailer chassis for supporting and guiding the skids, and the stanchions forwardly of the trailer chassis and the latch thereon whereby the receptacle is secured against longitudinal displacement.
FIGURE 15 is a sectional elevational view taken on the line 15—15 of FIGURE 14.
FIGURE 16 is a fragmentary side elevational view on an enlarged scale showing a portion of the apparatus substantially as illustrated in FIGURE 14, and showing the latch in detail.
FIGURE 17 is a fragmentary perspective view of an enlarged scale showing other details of the latch mechanism.

The trailer chassis 20 has a vertical abutment frame 28 forwardly thereof for engagement by one of the receptacles 10 to limit forward movement thereof, and latch means 29 on the abutment 28 engageable with the forward receptacle 10, to prevent displacement thereof in a rearward direction. The latch assembly is illustrated best in FIGURE 16 and comprises a detent 30 which is rigidly attached to a transverse rod 31 arranged through the abutment frame 28 and bent upwardly at one end to provide a lever 32 having a handle portion 33, as shown in FIGURE 17. The latch detent 30 is biased downwardly by a spring 34 and the lever 32, when the detent 30 is engaged, is restrained by a bolt-latch 35, shown in FIGURE 17.

What is claimed is:

1. In a portable receptacle for transporting field harvested cotton to a cotton gin, in combination with a truck-drawn trailer unit having a frame, and winch and cable means on said frame for loading and unloading said receptacle thereon, the improvements comprising: a framed structure having a bottom and detachable side and end members, the said side and end members each comprising a single panel having a light weight frame and formed substantially of open wire mesh, the said bottom having a frame and a wire mesh on said frame reinforced by a thickness of expanded metal in supporting engagement therewith, a pair of skids on said frame, and means for detachably securing said side and end members in upright position on said bottom whereby said members can be dismantled and compactly stacked with said bottom for storage and transportation.

2. The structure of claim 1, the said bottom frame having means thereon for releasable engagement with latching means on said trailer unit for securing said receptacle against involuntary displacement from said trailer unit while in transit.

References Cited

UNITED STATES PATENTS

| | | | |
|---|---|---|---|
| 1,250,505 | 12/1917 | Reasoner | 214—515 |
| 2,021,952 | 11/1935 | Wren | 214—517 |
| 2,529,752 | 11/1950 | Whittle | 214—517 |
| 2,648,455 | 8/1953 | Bitney | 220—19 XR |
| 3,159,295 | 12/1964 | Love | 214—517 |

ALBERT J. MAKAY, *Primary Examiner.*

U.S. Cl. X.R.

214—77; 120—19